United States Patent
Steading

(10) Patent No.: US 8,640,159 B2
(45) Date of Patent: Jan. 28, 2014

(54) METHODS, SYSTEMS, AND DEVICES FOR REDUCING BANDWIDTH CONSUMPTION IN MULTIMEDIA DISTRIBUTION SYSTEMS

(75) Inventor: David Steading, Marietta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 2077 days.

(21) Appl. No.: 10/944,230

(22) Filed: Sep. 17, 2004

(65) Prior Publication Data

US 2006/0064729 A1  Mar. 23, 2006

(51) Int. Cl.
  *H04N 7/16* (2011.01)
  *H04N 5/445* (2011.01)
  *H04N 7/173* (2011.01)
(52) U.S. Cl.
  USPC ........ 725/29; 725/9; 725/10; 725/13; 725/37; 725/94; 725/95; 725/98
(58) Field of Classification Search
  USPC ..................... 725/119, 120, 94–97
  See application file for complete search history.

(56) References Cited

U.S. PATENT DOCUMENTS

| 5,194,951 | A | * | 3/1993 | Hailey et al. ............ 348/581 |
| 5,572,347 | A | * | 11/1996 | Burton et al. ............ 398/71 |
| 6,166,730 | A | * | 12/2000 | Goode et al. ............ 715/716 |
| 6,594,826 | B1 | | 7/2003 | Rao |
| 6,642,938 | B1 | | 11/2003 | Gilboy |
| 6,651,089 | B1 | | 11/2003 | Stead |
| 6,674,958 | B2 | * | 1/2004 | Wehmeyer et al. ......... 386/83 |
| 2002/0059626 | A1 | | 5/2002 | Lemmons |
| 2002/0152471 | A1 | | 10/2002 | DeHaas |
| 2003/0101460 | A1 | | 5/2003 | Liu |
| 2003/0217365 | A1 | * | 11/2003 | Caputo ................ 725/95 |
| 2004/0128693 | A1 | | 7/2004 | Weigand |
| 2004/0133907 | A1 | | 7/2004 | Rodriguez |
| 2005/0240961 | A1 | * | 10/2005 | Jerding et al. .......... 725/37 |
| 2005/0246707 | A1 | * | 11/2005 | Ismail et al. ........... 718/100 |
| 2006/0130105 | A1 | * | 6/2006 | Simmons, Jr. et al. ..... 725/105 |

* cited by examiner

*Primary Examiner* — Nasser Goodarzi
*Assistant Examiner* — Kyu Chae
(74) *Attorney, Agent, or Firm* — Scott P. Zimmerman, PLLC

(57) ABSTRACT

Methods, systems, and devices are disclosed for reducing bandwidth consumption in a switched broadcast multimedia distribution system. When a subscriber requests a channel, bandwidth is allocated to deliver a current program to the subscriber via the requested channel. The allocated bandwidth is then terminated upon expiration of a timer. The timer may have a defined value, or the timer may correspond to program scheduling.

18 Claims, 9 Drawing Sheets

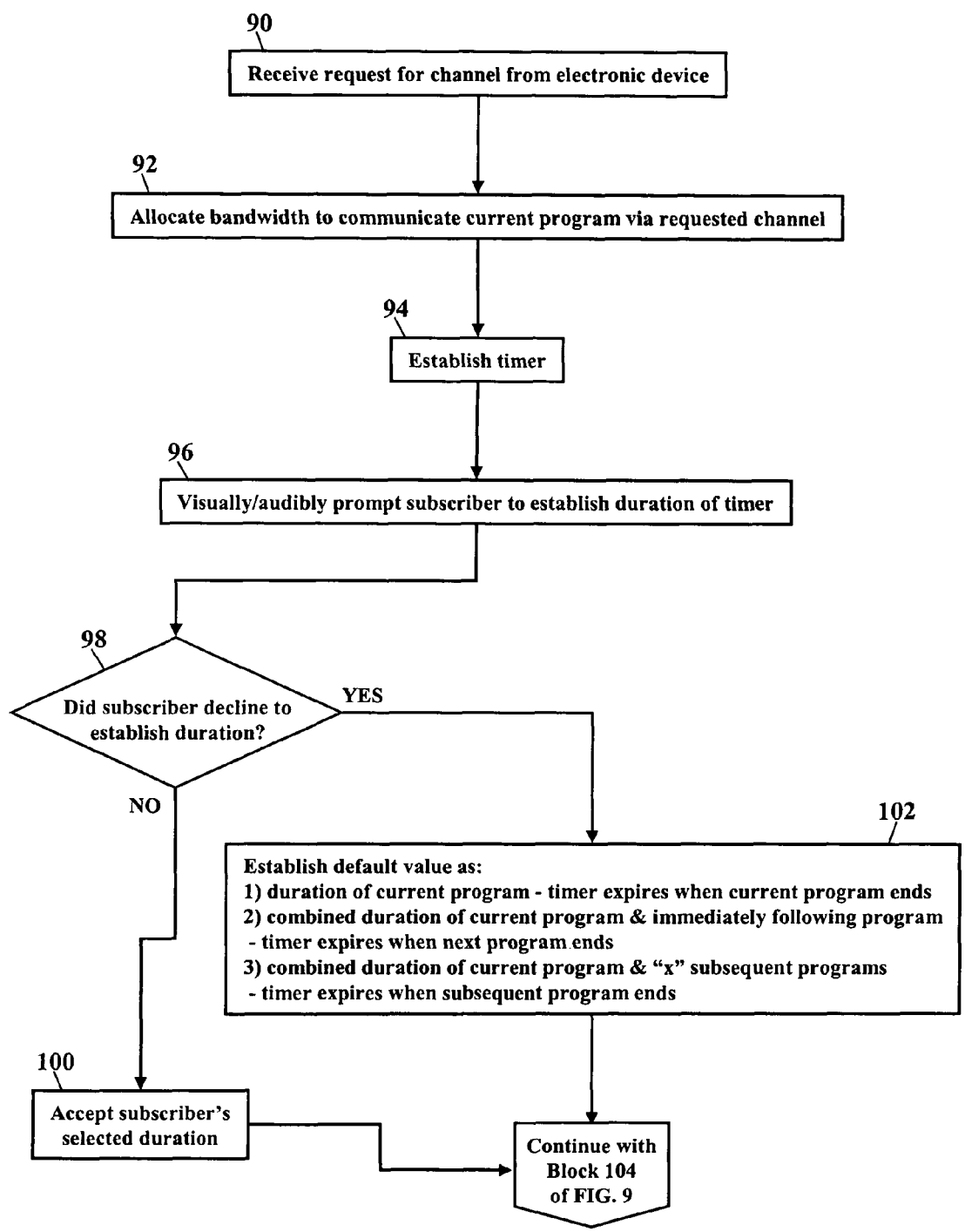

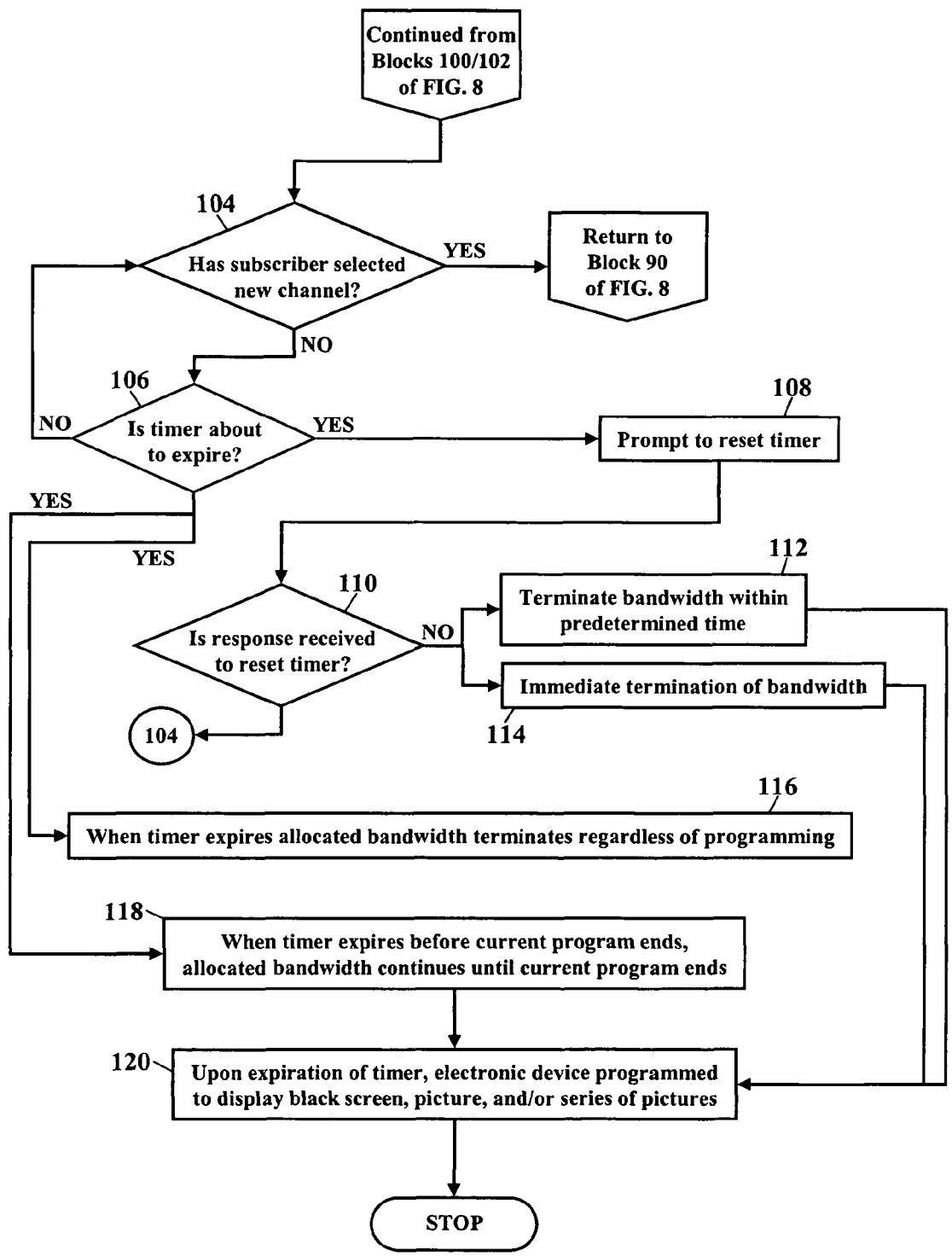

METHODS, SYSTEMS, AND DEVICES FOR REDUCING BANDWIDTH CONSUMPTION IN MULTIMEDIA DISTRIBUTION SYSTEMS

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This application generally relates to interactive multimedia distribution systems and, more particularly, to channel or bandwidth allocation in such systems.

Bandwidth is becoming a problem in the cable industry. As cable subscribers demand more and more channels, interactive services, on-demand services, and data services, the existing cable infrastructure has trouble supplying adequate bandwidth. The industry is hard at work identifying new ways of increasing bandwidth. The industry is also striving to reduce wasted bandwidth.

An "always on" set-top box is one example of wasted bandwidth. An "always on" set-top box continually receives content on a channel, even while no one is watching television. When the set-top box remains powered "on" and tuned to a channel, the set-top box is consuming bandwidth. Often times, however, that channel is not watched and bandwidth is wasted. Many cable subscribers, for example, forget to turn "off" their set-top box. Many cable subscribers remember to power "off" the television, yet the subscriber forgets to power "off" the set-top box. So, the set-top box remains powered "on" and receiving content on a channel. It's not uncommon for a set-top box to continually receive a video stream while the subscriber sleeps for hours and/or vacations for days. No one is watching the channel, yet the channel is consuming three megabits or more per second of network bandwidth to transmit the content to the set top box. This reduces the efficiency of the cable network. Because so many subscribers waste bandwidth, there is a need in the art for reducing bandwidth consumption in multimedia distribution systems.

SUMMARY

The aforementioned problems, and other problems, are reduced, according to exemplary embodiments, by methods, systems, and devices that reduce bandwidth consumption in multimedia distribution systems. These exemplary embodiments describe how a multimedia service provider can reduce the occurrences of wasted bandwidth. Because so many subscribers fail to turn "off" any device that receives RF and/or digital content, these exemplary embodiments describe a timer. When a subscriber requests content, such as a multimedia stream or a program on a channel, this timer is established. As the subscriber hears/watches the content, the timer counts down. When the timer expires, the bandwidth allocated for the content terminates. So, when the timer expires, the subscriber's electronic device stops receiving, and wasting, precious bandwidth. The exemplary embodiments of this timer, however, allow the subscriber to easily customize the timer, such as choosing the duration of the timer and when/how the timer is reset. The subscriber, then, can configure the timer to suit their viewing/listening habits, yet, not waste bandwidth.

The exemplary embodiments reduce bandwidth consumption in a switched multimedia distribution system. A request for a channel is received from an electronic device, such as a set-top box. Bandwidth is allocated to communicate a current program to the electronic device via the requested channel. The allocated bandwidth is then terminated upon expiration of a timer. The timer may have a defined or specified value, such that when the timer expires, the allocated bandwidth is terminated. The timer may additionally or alternatively correspond to programming schedules, such that when the current program ends, the timer expires. The timer may optionally expire when an immediately following program ends, or the timer may expire when subsequent programs (such as the next "x" programs) end.

According to another embodiment, a set-top box may be programmed to reduce bandwidth consumption. The set-top box tunes to a requested channel to receive a current program. The timer is established. When the timer expires, the allocated bandwidth for the requested channel is terminated, thus automatically reducing bandwidth consumption. The timer may have a default value, or a subscriber may select the timer value. The timer may additionally or alternatively correspond to programming schedules.

Other systems, methods, and/or devices according to the exemplary embodiments will be or become apparent to one with skill in the art upon review of the following drawings and detailed description. It is intended that all such additional systems, methods, and/or devices be included within this description, be within the scope of the exemplary embodiments, and be protected by the accompanying claims.

BRIEF DESCRIPTION OF THE DRAWINGS

These and other features, aspects, and advantages of the exemplary embodiments are better understood when the following Detailed Description is read with reference to the accompanying drawings, wherein:

FIG. 7 is a schematic illustrating a community antenna television network utilizing the teachings of the exemplary embodiments; and FIGS. 8 and 9 are flowcharts illustrating a method of reducing bandwidth consumption in a switched multimedia distribution system according to exemplary embodiments.

DETAILED DESCRIPTION

Figure 1:
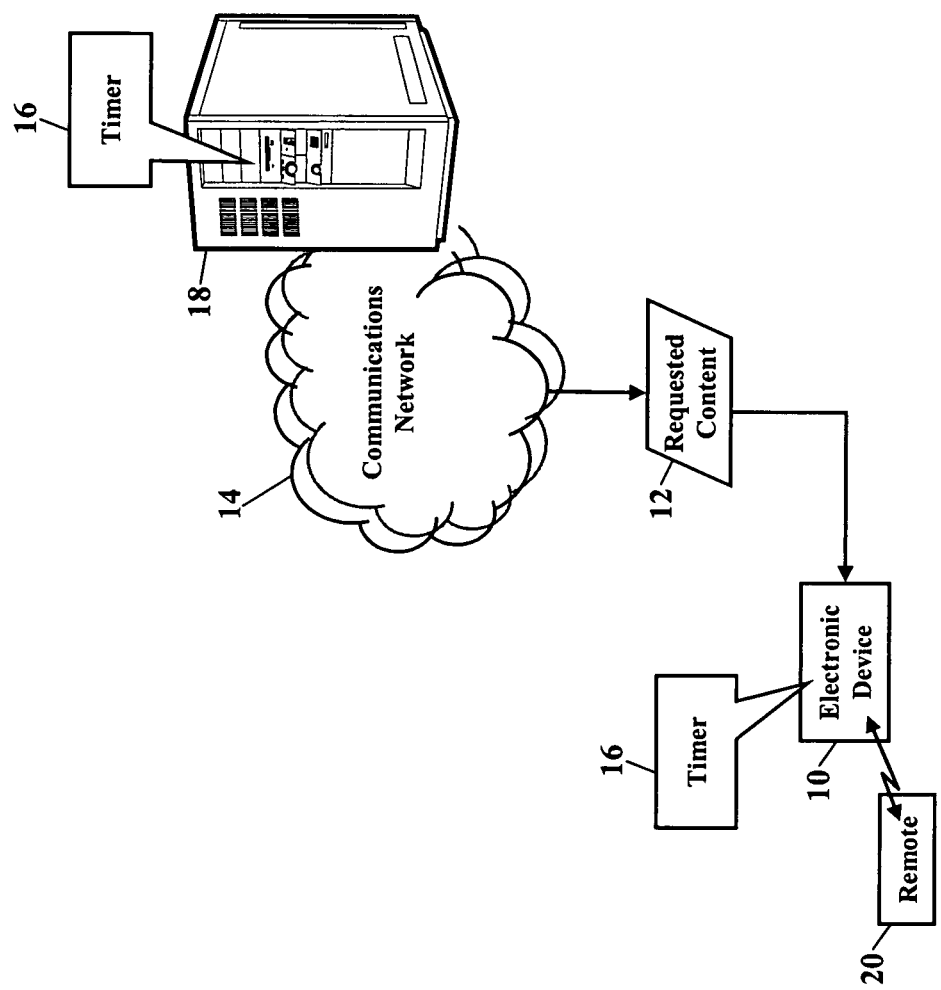
FIG. 1 is a simplified schematic illustrating an operating environment according to the exemplary embodiments.

The exemplary embodiments now will be described more fully hereinafter with reference to the accompanying drawings. The reader should recognize, however, that the invention may be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting exemplary embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

The exemplary embodiments describe methods, systems, and devices that reduce bandwidth consumption in multimedia distribution systems. These exemplary embodiments describe how a multimedia service provider can reduce the occurrences of wasted bandwidth. Because so many customers fail to turn "off" any device that receives RF and/or digital content, these exemplary embodiments describe a timer. When a subscriber requests content, such as a multimedia stream or a program on a channel, this timer is established. As the subscriber hears/watches the content, the timer counts down. When the timer expires, the bandwidth allocated for the content terminates. So, when the timer expires, the subscriber's electronic device stops receiving, and wasting, precious bandwidth. The exemplary embodiments of this timer, however, allow the subscriber to easily customize the timer, such as choosing the duration of the timer and when/how the timer is reset. The subscriber, then, can configure the timer to suit their viewing/listening habits, yet, not waste bandwidth. It should be appreciated that the term "subscriber" used throughout this description is not limited to a customer having an account with a content service provider. Rather, this term encompasses users that have access to the customer account but who may or may not be actual subscribers.

FIG. 1 is a simplified schematic illustrating an operating environment according to the exemplary embodiments. FIG. 1 shows an electronic device 10 receiving requested content 12 via a communications network 14. The electronic device 10 can be any device, such as an analog/digital recorder, television, CD/DVD player/recorder, audio equipment, receiver, tuner, and/or any other consumer electronic device. The electronic device 10 may also include any computer, peripheral device, camera, modem, storage device, telephone, personal digital assistant, and/or mobile phone. The communications network 14 may be a cable network operating in the radio-frequency domain and/or the Internet Protocol (IP) domain. The communications network 14, however, may also include a distributed computing network, such as the Internet (sometimes alternatively known as the "World Wide Web"), an intranet, a local-area network (LAN), and/or a wide-area network (WAN). The communications network 14 may include coaxial cables, copper wires, fiber optic lines, and/or hybrid-coaxial lines. The communications network 14 may even include wireless portions utilizing any portion of the electromagnetic spectrum and any signaling standard (such as the I.E.E.E. 802 family of standards).

As FIG. 1 shows, the electronic device 10 receives the requested content 12 via the communications network 14. The requested content 12 may be any RF and/or digital content, such as television/cable programming, mpg streams, or any other multimedia content. When the electronic device 10 receives the requested content 12, a timer 16 is also established. The electronic device 10 may be programmed to establish the timer 16, or some network server 18, operating within, or communicating with, the communications network 14 may establish the timer 16 upon request or delivery of the requested content 16. However the timer 16 is established, a subscriber is able to view, hear, or otherwise experience the requested content 12 until the timer 16 expires. When the timer 16 expires, the allocated bandwidth for the requested content 12 is terminated, thus automatically reducing bandwidth consumption. If the subscriber wishes to continue receiving content, the subscriber would take other actions, as will be explained, that reset the timer 16.

The timer 16 may have a default value. That is, when the timer 16 is established, the subscriber is able to enjoy the requested content 12 until the timer 16 expires. If the timer 16 has a default value of sixty (60) minutes, for example, then the allocated bandwidth would automatically terminate after one (1) hour of experiencing the requested content 12. The subscriber must then reset the timer 16 before continuing to receive content. The timer 16, of course, may have any value/duration, from seconds to hours to even days or weeks. The shorter the duration of the timer 16, however, the more opportunities for reducing wasted bandwidth.

The timer 16 may alternatively correspond with programming schedules. Whatever the subscriber wishes to experience, the timer 16 may have a value that corresponds with the programming schedule of the requested content 12. Whatever current content the subscriber desires to receive, the timer 16 has a value corresponding to the duration of the current content. The timer 16 will then expire when the current content ends. Suppose, for example, the subscriber desires to receive a movie, and the length of the movie is two (2) hours. The subscriber typically uses a remote 20 to command the electronic device 10 to request the desired movie. When the electronic device 10 receives the requested content 12 (in this case the movie), the timer 16 is established with a value of two (2) hours, corresponding to the time length of the movie. When the movie ends, the timer 16 also expires. Whatever bandwidth that was allocated for the movie is now terminated and made available for other uses and/or customers. Whether the requested content 12 is a movie, slide show, .mpg file(s), music, or other multimedia content, in this example the timer 16 corresponds to the end time of the requested content 12.

The timer 16 may alternately correspond to other programming schedules. Whatever the requested content 12, the timer 16 may have a value corresponding to a combined duration of the current program and an immediately following program. Returning to the example of the two-hour movie, suppose a thirty (30) minute documentary immediately follows the movie. The timer 16 may have a value of the combined duration of 2.5 hours (120 minutes for the movie plus 30 minutes for the documentary). Here the timer 16 would expire when the next program ends, e.g., at the end of the documentary immediately following the two-hour movie. The timer 16, of course, could alternately correspond to a combined duration of the current program and any subsequent program, such that the timer 16 expires when the subsequent program ends. Suppose the thirty (30) minute documentary is immediately followed by a thirty (30) minute "I Love Lucy" rerun and then sixty (60) minutes of music videos. When the subscriber desires to receive the two-hour movie, the timer 16 could be established with a value of 240 minutes. The subscriber could thus watch the movie, the documentary, the "I Love Lucy" rerun, and the music videos, all before the timer 16 expires. The timer 16, in general, could be program limited with a duration of a current program, a combined duration of the current program plus an immediately following program, or even a combined duration of the current program plus "x" subsequent programs, where x is an integer.

The timer 16 may be defined by both time and programming schedule. The timer 16, as described above, may have a default value (e.g., 60 minutes in one of the above examples). When the timer 16 expires, the allocated bandwidth terminates regardless of programming. Whatever the default value is, expiration of the timer 16 abruptly ends the requested content 12. The timer 16, unfortunately, could expire during the climaxing moment of the movie or other content, thus frustrating and even alienating the subscriber. The timer 16, then, may be configured to never expire during a current program. That is, the duration of the timer 16 is coordinated with program times. Even if the timer 16 expires before the current program ends, bandwidth is continually allocated until the current program ends. In this way the timer 16 cannot abruptly terminate bandwidth, thus spoiling the subscriber's enjoyment of the requested content 12.

Figure 2:
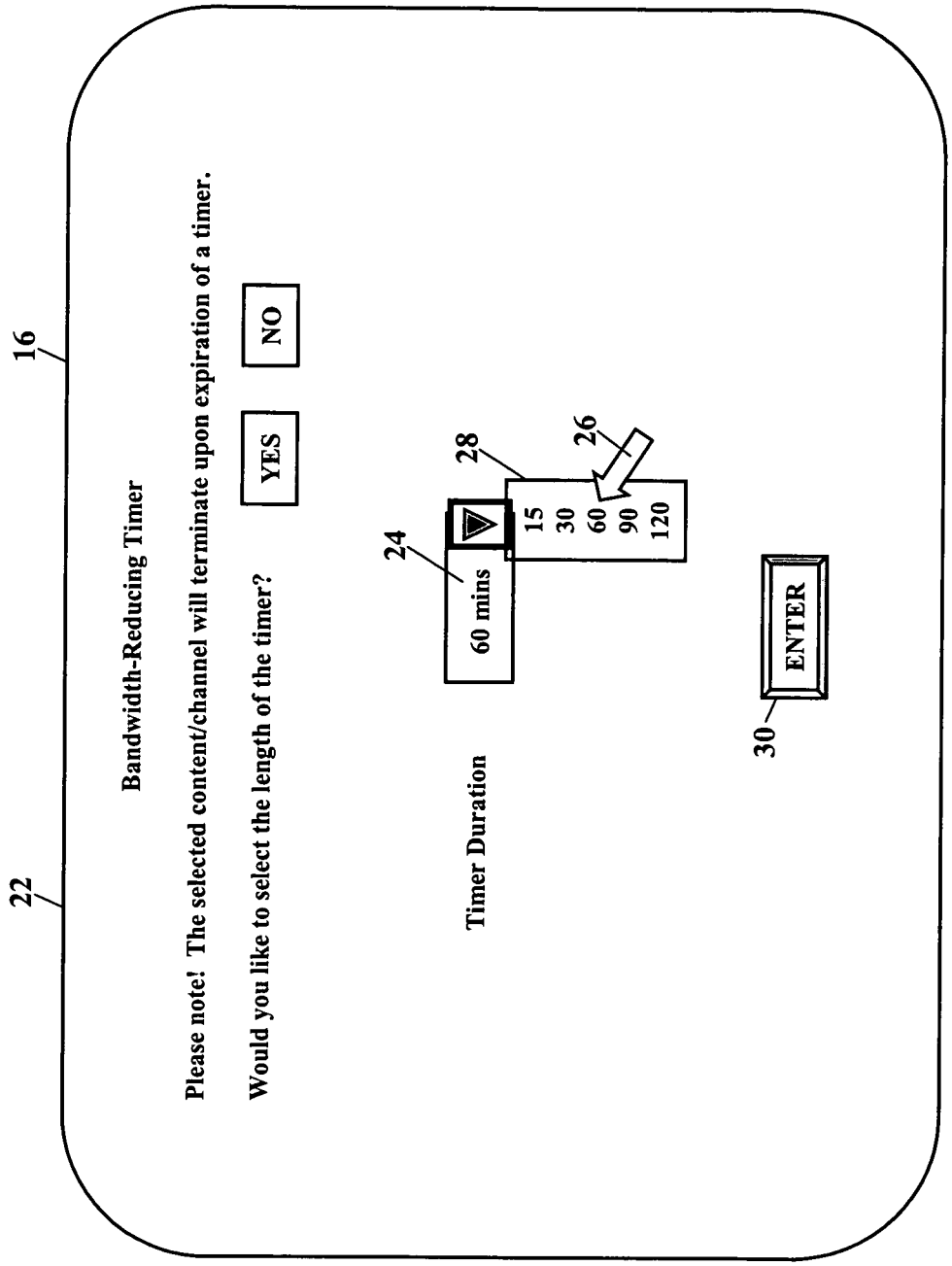
FIG. 2 is a schematic illustrating a user interface for configuration of a timer, according to exemplary embodiments.

FIG. 2 is a schematic illustrating a user interface for configuration of the timer, according to more exemplary embodiments. The subscriber may have the option of selecting or defining the timer 16. When the subscriber makes a selection of content, or when the selected content is delivered to the electronic device (shown, respectively, as reference numerals 12 and 10 in FIG. 1), the subscriber may be visually and/or audibly prompted to select the value of the timer 16. FIG. 2, for example, illustrates a screen prompt 22. The screen prompt 22 is visually presented on a display (not shown) of the electrical device 10. The electrical device 10 may alternately or additionally present the screen prompt 22 using a monitor, a television, user interface, or other display device. The electrical device 10 may alternately or additionally cause the screen prompt 22 to be presented using a monitor, a television, user interface, or other display device. However the screen prompt 22 is presented, the screen prompt 22 is a graphical user interface that includes one or more fields for establishing the value of the timer 16.

As FIG. 2 shows, the screen prompt 22 includes a timer duration data field 24. The subscriber uses the remote (shown as reference numeral 20 in FIG. 1) to place a cursor 26 in the timer duration data field 24. The subscriber may define the timer by entering the numerical duration of the timer value. The subscriber may additionally or alternatively be offered a menu listing 28 of predefined timer durations. The subscriber scrolls through the listing and selects the duration of the timer, thus determining when the timer will expire. The subscriber then finalizes the defined timer, such as by depressing an "enter" button on the remote or by placing the cursor 26 on an "Enter" field 30 for acceptance. If the electronic device (shown as reference numeral 10 in FIG. 1) does not accept commands/inputs via the remote, the electronic device usually includes a user interface with buttons, scrolls, menus, and other data entry abilities. The electronic device may alternatively accept inputs from a mouse or other tactile device and/or from voice commands.

As FIG. 2 also illustrates, the subscriber may choose whether to self-select the timer 16. The screen prompt 22 may ask the subscriber to define the duration of the timer 16. If the subscriber selects "no," the timer would revert to a default duration (such as 60 minutes). If, however, the subscriber decides to define the duration of the timer 16, the subscriber places the cursor 26 in the timer duration data field and enters their selection.

Figure 3:
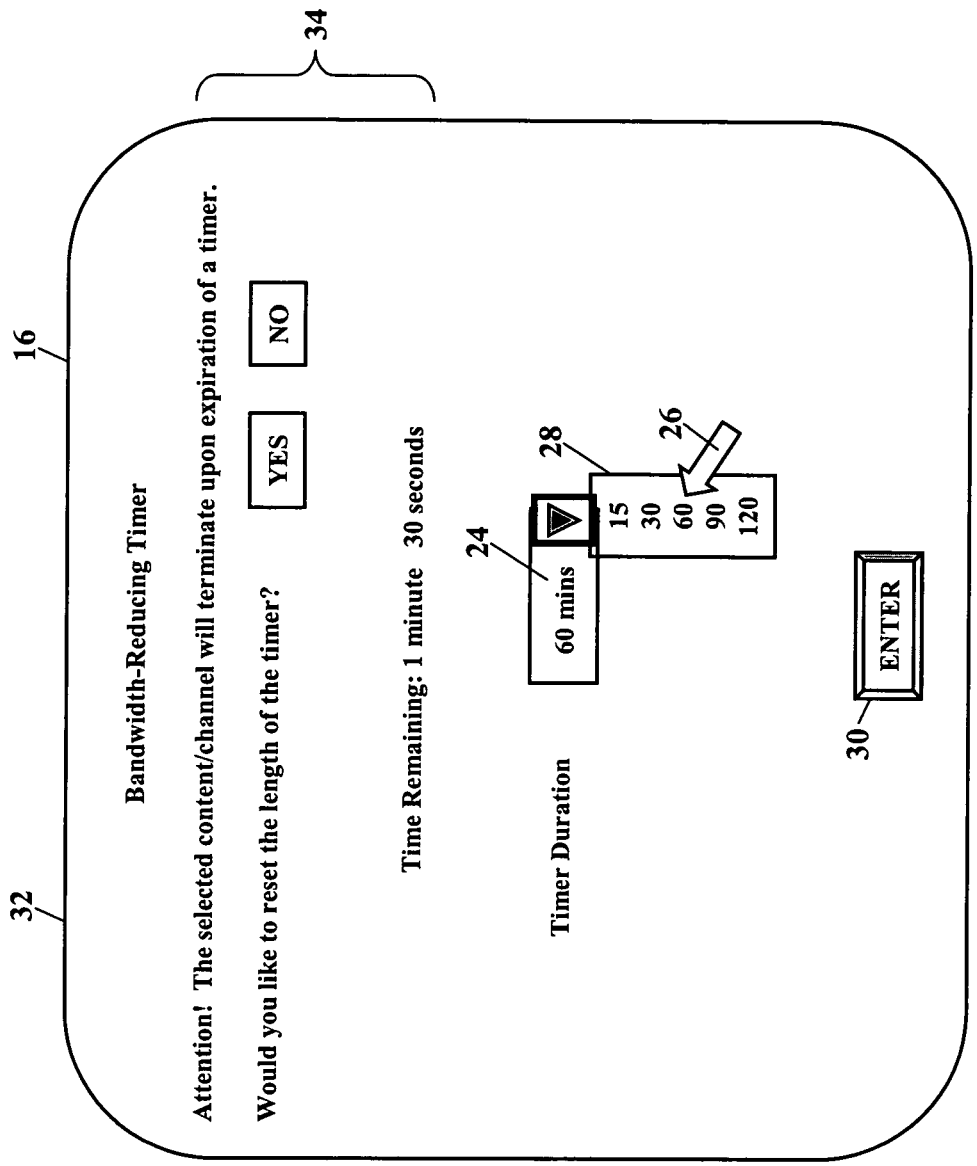
FIG. 3 is a schematic illustrating a user interface for resetting the timer, according to exemplary embodiments.

FIG. 3 is a schematic illustrating resetting the timer 16, according to more exemplary embodiments. Once the timer 16 is established, the subscriber is able to view, hear, or otherwise experience the requested content 12 until the timer 16 expires. When the timer 16 expires, the allocated bandwidth for the requested content 12 is terminated, thus automatically reducing bandwidth consumption. If the subscriber wishes to continue receiving content, the subscriber must reset the timer 16. FIG. 3, then, illustrates a reset dialog box 32 that is audibly/visually presented on a display, monitor, television, user interface, or other display device. The reset dialog box 32 is another graphical user interface that prompts the subscriber to reset the timer. The reset dialog box 32 includes a textual message 34 that displays the remaining duration of the timer 16. The textual message 34 also asks whether the subscriber wants to reset the timer 16 and presents "Yes" or "No" options. If the subscriber selects "Yes" (using the remote, user interface, tactile device, and/or voice commands), the allocated bandwidth continues. Selecting "No" would cause the bandwidth to terminate upon expiration of the timer 16.

When the subscriber opts to reset the timer 16, the subscriber may define the duration of the timer. The reset dialog box 32, as earlier mentioned, prompts the subscriber to reset the timer 16. When the subscriber selects "Yes," the reset dialog box 32 may also present the timer duration data field 24. The timer duration data field 24 allows the subscriber to enter the numerical duration of the timer value. The timer duration data field 24 may additionally or alternatively present the menu listing 28 of predefined timer durations. The subscriber selects the reset duration of the timer, thus determining when the reset timer will again expire. If the subscriber selects "Yes," yet does not self-define the duration of the timer 16, the timer 16 would revert to a default value and/or to the remaining length of the current program or subsequent programs.

The reset dialog box 32 is preferably displayed before the timer 16 actually expires. The reset dialog box 32 could be presented ten at (10) minutes, at five (5) minutes, and/or at any time before expiration of the timer. Whenever the reset dialog box 32 is presented, the reset dialog box 32 preferably gives the subscriber adequate time to decide to reset. One option might always prompt the subscriber to reset the timer 16 at one (1) minute before expiration, and the reset dialog box 32 would continuously present the remaining seconds of the timer 16. It is also preferable to size and present the reset dialog box 32 to a corner of the display, monitor, television, user interface, or other display device. The reset dialog box 32 is preferably displayed in such a way as to still permit the subscriber to experience the content.

The subscriber may be required to respond to the reset dialog box 32. That is, the subscriber may be required select either "Yes" or "No" when presented. If the subscriber fails to respond to the reset dialog box 32, bandwidth may automatically terminate, regardless of the remaining duration of the timer 16. When the subscriber fails to respond to the reset dialog box 32, the electronic device 10 and/or the content provider may infer that no one is watching, listening, or otherwise experiencing the delivered content. Bandwidth is likely being wasted, so the electronic device 10 and/or the content provider may unilaterally decide to immediately terminate the allocated bandwidth.

The timer may also reset with a new content request. The subscriber may be experiencing one content stream and decide to request a different content stream. The subscriber, for example, may not enjoy the current programming and decide to request different programming. When the subscriber makes a new content selection, the electronic device 10 issues a request for the new content. This request for new content could automatically reset the timer 16. Suppose, again, the subscriber has requested a two-hour movie, and the timer 16 is established for 120 minutes. Forty (40) minutes later the subscriber decides other content might be more interesting, so the subscriber requests a thirty (30) minute rerun of "Mayberry RFD." Although the timer 16 was originally established at 120 minutes, the newly requested rerun of "Mayberry RFD" could cause the timer 16 to re-establish at thirty (30) minutes. The timer 16, as earlier described, could alternately reset to a combined duration of current programming and any subsequent programming. Here, then, whenever new content is requested, the timer automatically resets.

Figure 4:
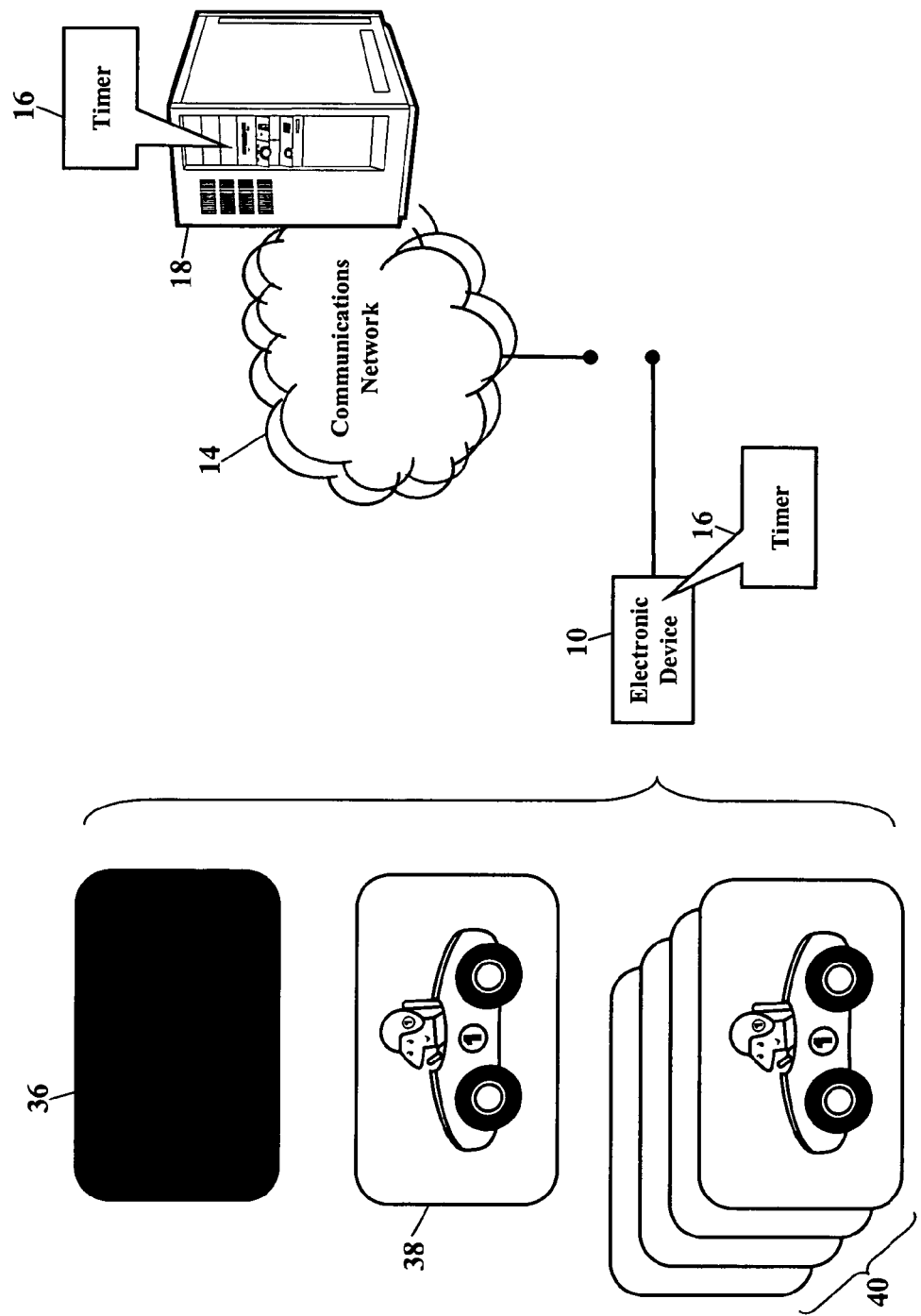
FIG. 4 is a schematic illustrating display options when the timer expires, according to exemplary embodiments.

FIG. 4 is a schematic illustrating display options when the timer 16 expires, according to even more exemplary embodiments. The subscriber, as earlier explained, is able to view, hear, or otherwise experience the requested content 12 until the timer 16 expires. When the timer 16 expires, the allocated bandwidth for the requested content 12 is terminated, thus automatically reducing bandwidth consumption. When the bandwidth terminates, the electronic device 10 no longer receives content. The electronic device 10, then, may be programmed with various display options. One option is to simply display a blank screen, e.g., a black screen 36, when the bandwidth terminates. Another option is to display a single picture file 38 when the bandwidth terminates. Display of a single picture, however, may be detrimental to the display (e.g., "burn in"). Still another option would be to display a series 40 of pictures, such as a revolving set of MPEG frames. The subscriber may even be permitted to select the displayed pictures from a menu, and/or the subscriber could upload pictures for storage in the electronic device 10. The subscriber could even select music or other audible indications that the bandwidth had been terminated.

Figure 5:
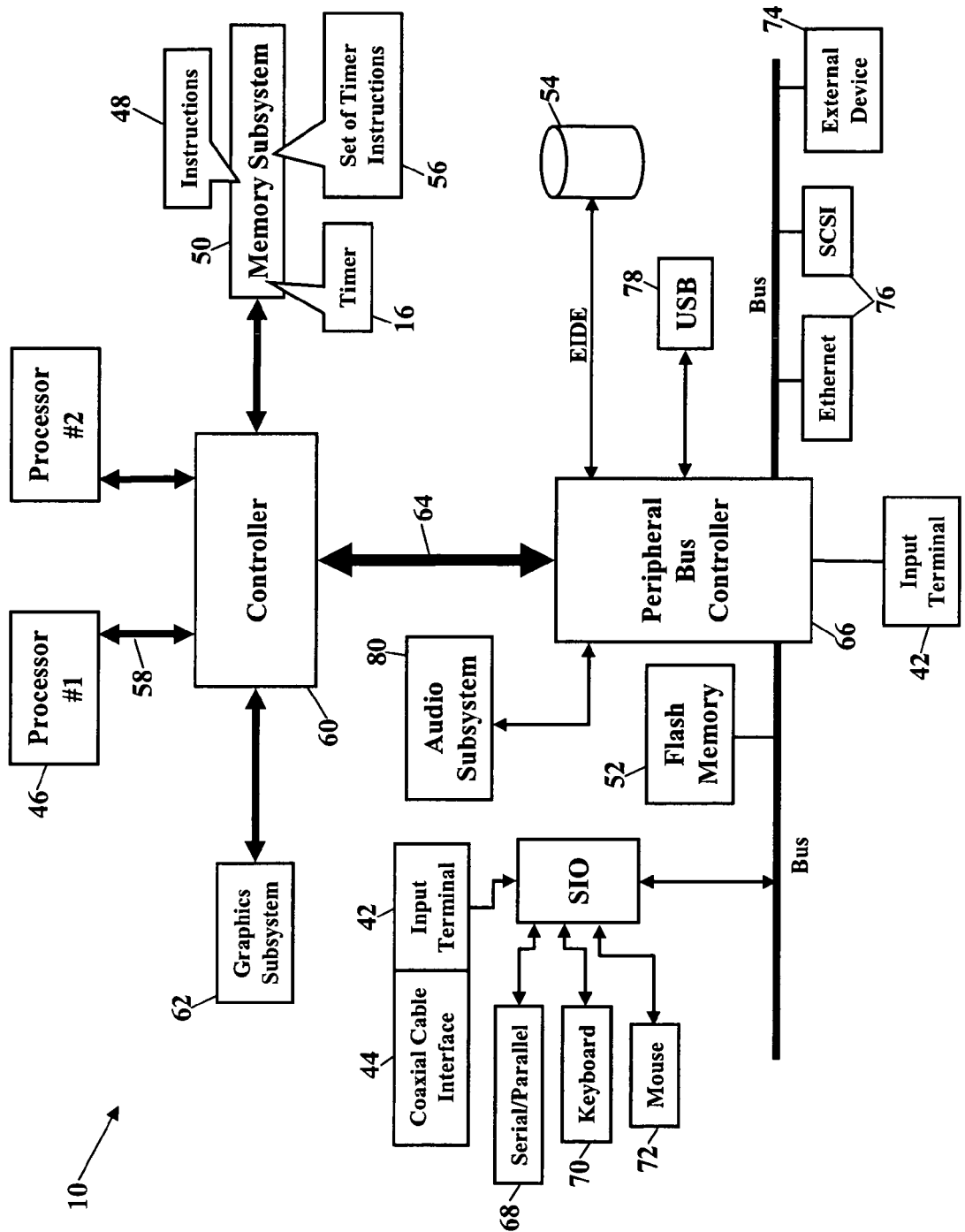
FIG. 5 is a block diagram of exemplary details of an electrical device shown in FIGS. 1 and 4.

FIG. 5 is a block diagram of exemplary details of the electrical device 10 shown in FIGS. 1 and 4. The electrical device 10 can be any device, such as an analog/digital recorder, television, CD/DVD player/recorder, audio equipment, receiver, tuner, and/or any other consumer electronic device. The electrical device 10 may also include any computer, peripheral device, camera, modem, storage device, telephone, personal digital assistant, and/or mobile phone. The electrical device 10 may also be configured as a set-top box ("STB") receiver that receives and decodes digital signals. The electrical device 10, in fact, can be any electronic/electrical device that has an input 42 for receiving the requested content (shown as reference numeral 12 in FIGS. 1 and 4). The input 42 may include a coaxial cable interface 44 for receiving signals via a coaxial cable (not shown). The input 42 may additionally or alternatively include an interface to a fiber optic line, to a telephone line (such as an RJ-48/56), to other wiring, and to any male/female coupling. The electrical device 10 includes one or more processors 46 executing instructions 48 stored in a system memory device. The instructions 48, for example, are shown residing in a memory subsystem 50. The instructions 48, however, could also reside in flash memory 52 or a peripheral storage device 54. When the processor 46 executes the instructions 48, the processor 46 may also establish the timer 12. The processor 46 may establish the timer 16 by executing a set 56 of timer instructions stored in the system memory device. The processor 46, however, may additionally or alternatively establish the timer 16 by informing the network server, operating within the communications network, to establish the timer 16 upon request or delivery of the requested content (the network server, the communications network, and the requested content are shown, respectively, as reference numerals 18, 14, and 12 in FIG. 1). The one or more processors 46 may also execute an operating system that controls the internal functions of the electrical device 10. A bus 58 may communicate signals, such as data signals, control signals, and address signals, between the processor 46 and a controller 60. The controller 60 provides a bridging function between the one or more processors 46, any graphics subsystem 62 (if desired), the memory subsystem 50, and, if needed, a peripheral bus 64. The peripheral bus 64 may be controlled by the controller 60, or the peripheral bus 64 may have a separate peripheral bus controller 66. The peripheral bus controller 66 serves as an input/output hub for various ports. These ports include the input terminal 42 and perhaps at least one output terminal. The ports may also include a serial and/or parallel port 68, a keyboard port 70, and a mouse port 72. The ports may also include one or more external device ports 74, networking ports 76 (such as SCSI or Ethernet), and a USB port 78. The electrical device 10 may also include an audio subsystem 80. The electrical device 10 may also include a display device (such as LED, LCD, plasma, or any other) to present instructions, messages, tutorials, and other information to a user. The apparatus 10 may further include one or more encoders, one or more decoders, input/output control, logic, one or more receivers/transmitters/transceivers, one or more clock generators, one or more Ethernet/LAN interfaces, one or more analog-to-digital converters, one or more digital-to-analog converters, one or more "Firewire" interfaces, one or more modem interfaces, and/or one or more PCMCIA interfaces. Those of ordinary skill in the art understand that the program, processes, methods, and systems described herein are not limited to any particular architecture or hardware.

The processors 46 may be implemented with a digital signal processor (DSP) and/or a microprocessor. Advanced Micro Devices, Inc., for example, manufactures a full line of microprocessors (Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Texas Instruments offers a wide variety of digital signal processors (Texas Instruments, Incorporated, P.O. Box 660199, Dallas, Tex. 75266-0199, Phone: 972-995-2011, www.ti.com) as well as Motorola (Motorola, Incorporated, 1303 E. Algonquin Road, Schaumburg, Ill. 60196, Phone 847-576-5000, www.motorola.com). There are, in fact, many manufacturers and designers of digital signal processors, microprocessors, controllers, and other componentry that are described in this patent. Those of ordinary skill in the art understand that this componentry may be implemented using any suitable design, architecture, and manufacture. Those of ordinary skill in the art, then understand that this invention is not limited to any particular manufacturer's component, nor architecture, nor manufacture.

The memory (shown as memory subsystem 50, flash memory 52, or peripheral storage device 54) may also contain an application program. The application program cooperates with the operating system and with a video display device to provide a Graphical User Interface (GUI). The graphical user interface provides a convenient visual and/or audible interface with a user of the electrical device 10.

The timer 16 is useful for switched broadcast video distribution systems. A switched broadcast video ("SBV") system only broadcasts channels that subscribers have requested at any one time. Even though a service provider might offer 200 or more channels, perhaps only fifty percent (50%) are simultaneously viewed by the subscribers. The remaining channels are not broadcast and, thus, do not consume network bandwidth. Suppose, for example, a service area broadcasts RF and/or IP data to fifty (50) homes. Instead of delivering all 200 channels, the SBV service provider only delivers the channels that subscribers in that service area have requested. Those channels that are not requested, and thus not watched, do not consume bandwidth. Because only requested channels are delivered, extra bandwidth is available to offer other services (such as data services).

Figure 6:
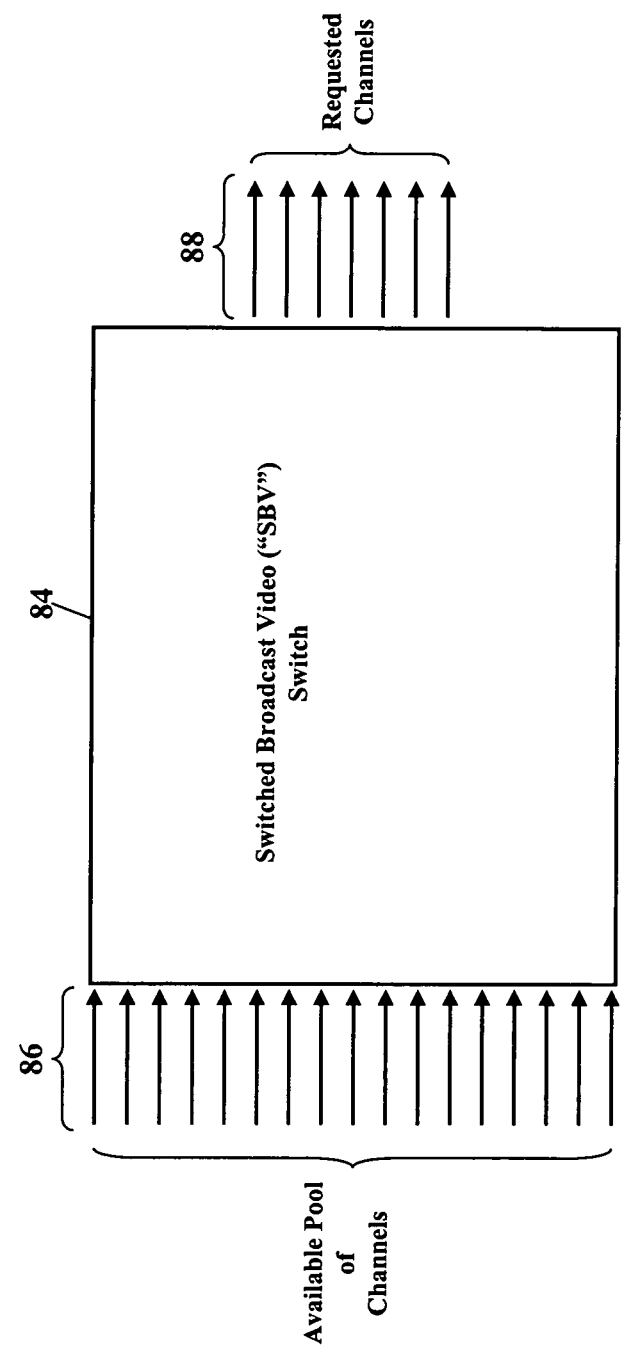
FIGS. 6 and 7 are simplified schematics illustrating a switched broadcast video distribution system, according to yet more exemplary embodiments.
Figure 7:
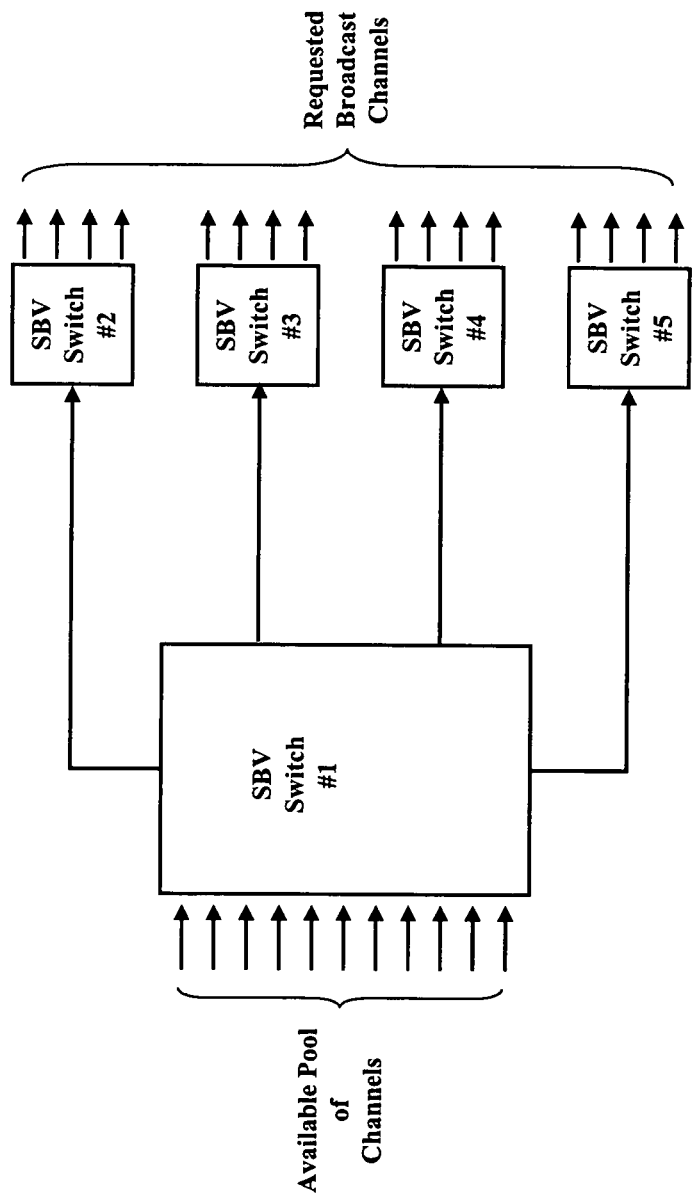

FIGS. 6 and 7 are simplified schematics illustrating a switched broadcast video distribution system 82. As FIG. 6 illustrates, a switch 84 only distributes those channels requested by the subscribers in a given area. The switch 84 receives a larger pool 86 of channels, but the switch 84 only delivers/distributes those channels 88 that are requested by subscribers along a network segment. The switched broadcast video distribution system 82 operates in both the radio frequency (RF) domain and the Internet Protocol (IP) domain to deliver either or both RF content and IP content. FIG. 7 extends this switching concept to illustrate multiple switches for feeding different network segments with differing sets of requested channels. Each set of output channels, all originating from the same larger pool of channels at a head end or serving office.

The timer 16, then, is useful for switched broadcast video distribution systems. The timer 16 may be used to prevent wasteful consumption of bandwidth resources. When a channel is requested by a subscriber, that requested channel is delivered along the network segment. That channel is broadcast in the RF domain so that anyone on that segment may watch the channel. In the IP domain (such as in an IP switched digital network) the requested channel is multi-cast, allowing other subscribers to join the session already in progress. Whatever the domain, the content delivered along that requested channel consumes precious bandwidth. As long as the electronic device 10 (such as a computer or set-top box) is powered and receiving the content, that channel is continually delivered along the network segment.

The timer 16, however, helps reduce bandwidth consumption. The timer 16 helps control and even reduce the instances of wasted bandwidth due to unwatched content/channels. When the subscriber requests content on a channel, the timer is established and starts counting down. When the timer expires, the bandwidth allocated to deliver that channel terminates. Unless the subscriber responds to on-screen and/or audible prompts to reset the timer 16, this concept will automatically terminate the channel bandwidth.

FIGS. 8 and 9 are flowcharts illustrating a method of reducing bandwidth consumption in a switched multimedia distribution system. A request for a channel is received from an electronic device (Block 90). Bandwidth is allocated to communicate a current program via the requested channel (Block 92). A timer is established (Block 94). A prompt may be visually/audibly presented that allows a subscriber to establish a duration of the timer (Block 96). If the subscriber accepts a prompt to define the duration of the timer (Block 98), then the subscriber's selected duration is accepted (Block 100). If, however, the subscriber declines to establish a duration of the timer (Block 98), then a default value is established (Block 102). The timer may have a value corresponding to a duration of the current program, such that the timer expires when the current program ends. The timer may also have a value corresponding to a combined duration of the current program and an immediately following program, such that the timer expires when a next program ends. The timer could also have a value corresponding to a combined duration of the current program and a subsequent program, such that the timer expires when the subsequent program ends.

The flowchart continues with FIG. 9. If a new channel is requested (Block 104), then the new channel is requested, bandwidth is allocated, and the timer is rest/re-established (see Block 90 of FIG. 8). When the timer is about to expire (Block 106), several options are available. The first option is to present a visual/audible prompt to reset the timer (Block 108). If no response is received to reset the timer (Block 110), then the bandwidth is terminated within a predetermined time (Block 112), such as immediately (Block 114) or after sixty (60) seconds. When the timer is about to expire (Block 106), a second option is to terminate the allocated bandwidth regardless of programming (Block 116). A third option, however, is when the timer expires before the current program ends, then the allocated bandwidth is continued until the current program ends (Block 118). Upon expiration of the timer, the electronic device may be programmed to display a black screen, display a picture, and/or display a series of pictures (Block 120).

The timer 16 may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the embodiments, allow the timer 16 to be easily disseminated. A computer program product for reducing bandwidth consumption includes computer-readable instructions stored on the computer-readable medium. A request is received for a channel from an electronic device. Bandwidth is allocated to communicate a current program to the electronic device via the requested channel. The allocated bandwidth is then terminated upon expiration of a timer.

The timer may also be physically embodied on or in any addressable (e.g., HTTP, I.E.E.E. 802.11, Wireless Application Protocol (WAP)) wire line or wireless device capable of presenting an IP address. Examples could include a computer, a wireless personal digital assistant (PDA), an Internet Protocol mobile phone, or a wireless pager.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method, comprising:
    sending a request for a channel from an electronic device in a switched broadcast video distribution system;

allocating bandwidth in a switch of the switched broadcast video distribution system to deliver a program to the electronic device on the channel;

switching the switch from amongst a pool of channels to deliver the channel;

retrieving a graphical user interface from memory of the electronic device;

receiving a selection of a user in a field of the graphical user interface that defines a numerical duration of a user-configurable timer for allocating the bandwidth to the channel;

beginning counting down the user-configurable timer from the numerical duration when the channel is received at the electronic device;

receiving the bandwidth allocated to the channel at the electronic device;

determining the timer is near expiration before the program ends; and when the timer is near expiration, three options are available consisting of:

a first option that generates a visual prompt to reset the timer, and the first option terminating the bandwidth within a predetermined time when no response to the visual prompt is received;

a second option that terminates the bandwidth at the expiration of the timer, regardless of whether the program has ended; and a third option that continues allocating the bandwidth after expiration of the timer until the program ends; and adopting one of the three options in response to the timer nearing the expiration, the one of the three options selected from the three options.

2. The method according to claim 1, further comprising establishing the timer at the numerical duration.

3. The method according to claim 1, further comprising initiating the timer upon delivery of the channel.

4. The method according to claim 1, further comprising expiring the timer at a final value.

5. The method according to claim 1, further comprising defining the numerical duration of the timer to a value corresponding to a combined duration of the program and a subsequent program, such that the timer expires when the subsequent program ends.

6. The method according to claim 1, further comprising displaying a menu listing of predefined numerical durations of the timer.

7. The method according to claim 1, further comprising:
receiving a new request for a new channel; and
re-establishing the numerical duration of the timer for allocating bandwidth for delivering the new channel.

8. The method according to claim 1, further comprising if the selection of the numerical duration is not received, then establishing a default value for the timer.

9. The method according to claim 1, further comprising establishing a default value for the numerical duration of the timer.

10. The method according to claim 1, further comprising displaying at least one of a blank screen, a picture, and a series of pictures when the timer expires.

11. The method according to claim 1, further comprising defining the numerical duration of the timer to be a combined time duration of the program plus an integer value of subsequent programs.

12. An electrical device, comprising:
a processor; and
memory storing code that when executed causes the processor to perform operations, the operations comprising:

sending a request for a channel from a set-top box to a switched broadcast video distribution system;

allocating bandwidth in a switch of the switched broadcast video distribution system to deliver a program to the set-top box on the channel;

switching the switch from amongst a pool of channels to deliver the channel and bandwidth for the program to the set-top box;

retrieving a graphical user interface from memory of the set-top box;

receiving a selection of a user in a field of the graphical user interface that defines a numerical duration of a user-configurable timer for allocating the bandwidth to the channel;

beginning counting down the user-configurable timer in response to the channel being received at the set-top box;

receiving the bandwidth at the set-top box that is allocated to the channel;

determining the timer is near expiration before the program ends; and when the timer is near expiration, three options are available consisting of:

a first option that generates a visual prompt to reset the timer, and the first option terminating the bandwidth within a predetermined time when no response to the visual prompt is received;

a second option that terminates the bandwidth at the expiration of the timer, regardless of whether the program has ended; and a third option that continues allocating the bandwidth after expiration of the timer until the program ends; and adopting one of the three options in response to the timer nearing the expiration, the one of the three options selected from the three options.

13. The electrical device according to claim 12, wherein the code further causes the processor to establish the numerical duration of the timer to a value corresponding to a time length of the program, such that the timer initially expires when the program ends.

14. The electrical device according to claim 12, wherein the code further causes the processor to establish the numerical duration of the timer to a value corresponding to a combined duration of the program and a subsequent program, such that the timer expires when the subsequent program ends.

15. The electrical device according to claim 12, wherein the code further causes the processor to receive a new request for a new channel and to re-establish the timer to receive the new channel.

16. The electrical device according to claim 12, wherein the code further causes the processor to display a menu listing of predefined numerical durations of the timer.

17. The electrical device according to claim 12, wherein the code further causes the processor to establish a default value for the timer.

18. A non-transitory computer-readable medium storing instructions for performing a method, the method comprising:

receiving a request for a requested channel from an electronic device in a switched broadcast video distribution system that allocates bandwidth to the requested channel and that declines to allocate bandwidth to channels that are not requested;

allocating the bandwidth in a switch of the switched broadcast video distribution system to deliver a program on the requested channel to the electronic device;

switching the switch from a pool of channels to deliver the requested channel and the bandwidth allocated to the requested channel;
retrieving a graphical user interface from memory of the electronic device;
receiving a selection of a user in a field of the graphical user interface that defines a numerical duration of a user-configurable timer for allocating the bandwidth to the requested channel;
beginning counting down the user-configurable timer when the channel is received at the electronic device;
receiving the requested channel at the electronic device;
determining the timer is near expiration before the program ends; and
when the timer is near expiration, three options are available consisting of:
a first option that generates a visual prompt to reset the timer, and the first option terminating the bandwidth within a predetermined time when no response to the visual prompt is received;
a second option that terminates the bandwidth at the expiration of the timer, regardless of whether the program has ended; and
a third option that continues allocating the bandwidth after expiration of the timer until the program ends; and
adopting one of the three options in response to the timer nearing the expiration, the one of the three options selected from the three options.

* * * * *